US009585418B2

(12) United States Patent
Lee

(10) Patent No.: US 9,585,418 B2
(45) Date of Patent: Mar. 7, 2017

(54) METHOD OF PRODUCING REBAUDIOSIDE D SWEETENED DIET CARBONATED SOFT DRINKS

(71) Applicant: PEPSICO, INC., Purchase, NY (US)

(72) Inventor: Thomas Lee, Scarsdale, NY (US)

(73) Assignee: PEPSICO, INC., Purchase, NY (US)

( * ) Notice: Subject to any disclaimer, the term of this patent is extended or adjusted under 35 U.S.C. 154(b) by 0 days.

(21) Appl. No.: 14/391,023

(22) PCT Filed: Apr. 8, 2013

(86) PCT No.: PCT/US2013/035555
§ 371 (c)(1),
(2) Date: Oct. 7, 2014

(87) PCT Pub. No.: WO2013/158390
PCT Pub. Date: Oct. 24, 2013

(65) Prior Publication Data
US 2015/0223510 A1    Aug. 13, 2015

Related U.S. Application Data

(60) Provisional application No. 61/624,439, filed on Apr. 16, 2012.

(51) Int. Cl.
*A23L 2/60* (2006.01)
*A23L 2/38* (2006.01)
(Continued)

(52) U.S. Cl.
CPC ...... *A23L 2/60* (2013.01); *A23L 2/38* (2013.01); *A23L 2/54* (2013.01); *A23L 2/56* (2013.01); *A23L 27/36* (2016.08); *A23V 2002/00* (2013.01)

(58) Field of Classification Search
CPC ...... A23L 2/38; A23L 2/54; A23L 2/60; A23L 1/2366
(Continued)

(56) References Cited

U.S. PATENT DOCUMENTS 4,808,346 A   2/1989   Strenger
6,890,580 B1  5/2005   Villagran et al.
(Continued)

FOREIGN PATENT DOCUMENTS

CN   103917111 A    7/2014
JP   S 61-100152 A  5/1986
(Continued)

OTHER PUBLICATIONS

Qiu, H-B. and Wu, Y-H., "Use of stevia in food and beverage industries," *The Beverage Industry* 13(3):38-40, China Beverage Industry Association, China (2010).
(Continued)

*Primary Examiner* — Helen F Heggestad
(74) *Attorney, Agent, or Firm* — Sterne, Kessler, Goldstein & Fox PLLC

(57) ABSTRACT

A method of producing a diet carbonated soft drink comprising combining water and a sweetening amount of Rebaudioside D (Reb D) to produce Reb D sweetened water; injecting carbon dioxide into the Reb D sweetened water to produce carbonated Reb D sweetened water; combining the carbonated Reb D sweetened water with unsweetened syrup to form the diet carbonated soft drink. Alternatively, the method comprises combining water and a sweetening amount of Rebaudioside D (Reb D) to produce Reb D sweetened water; combining the Reb D sweetened water with syrup; injecting carbon dioxide into the combined Reb D sweetened water and syrup to produce the diet carbonated soft drink.

12 Claims, 1 Drawing Sheet

(51) Int. Cl.
*A23L 2/54* (2006.01)
*A23L 2/56* (2006.01)

(58) Field of Classification Search
USPC .................................. 426/590, 591, 477
See application file for complete search history.

(56) References Cited

U.S. PATENT DOCUMENTS

| 2006/0222754 | A1  | 10/2006 | Singer |
| 2007/0104848 | A1* | 5/2007  | Thrasher ............... A23L 2/54 |
|              |     |         | 426/590 |
| 2007/0212468 | A1  | 9/2007  | White et al. |
| 2011/0091635 | A1  | 4/2011  | Abelyan et al. |
| 2011/0189360 | A1  | 8/2011  | Yoo et al. |

FOREIGN PATENT DOCUMENTS

| JP | 2004-520072 A | 7/2004 |
| JP | 2009-528846 A | 8/2009 |
| JP | 2010-521162 A | 6/2010 |
| WO | WO 97/23652 A1 | 7/1997 |
| WO | WO 02/087358 A1 | 11/2002 |
| WO | WO 2008/112839 A1 | 9/2008 |
| WO | 2011046423 A1 | 4/2011 |
| WO | WO 2013/066490 A1 | 5/2013 |

OTHER PUBLICATIONS

Zhu, H-L., et al., "The Properties and the Application in the Food of the Steviosides," *Food Research and Development* 32(11):189-192, Food Research Institute of Tianjin and Tianjin Food Industry Productivity Center, China (2011).
International Search Report mailed Jul. 29, 2013, for PCT/US2013/035555.
Chinese Application 201380020231.1, Office Action mailed Jun. 2, 2015.
Extended European Search Report for EP Application No. 13778986.3, Munich, Germany, mailed on Apr. 11, 2016, 11 pages.
Partial Supplementary European Search Report for EP Application No. 13778986.3, Munich, Germany, mailed on Dec. 14, 2015, 6 pages.

* cited by examiner

METHOD OF PRODUCING REBAUDIOSIDE D SWEETENED DIET CARBONATED SOFT DRINKS

CROSS-REFERENCE TO RELATED APPLICATIONS

The present application claims priority to U.S. Ser. No. 61/624,439, filed Apr. 16, 2012, and entitled "Method of Producing Rebaudioside D Sweetened Carbonated Soft Drinks" hereby incorporated by reference in its entirety.

FIELD OF INVENTION

The present invention is directed to a method of producing diet carbonated soft drinks sweetened with Rebaudioside D.

BACKGROUND

Sweet steviol glycoside compounds are present in small concentrations and can be extracted from plant materials, particularly the leaves of the *Stevia rebaudiana* Bertoni plant. In a crude *stevia* extract these compounds typically are found to include stevioside, steviolbioside, several Rebaudiosides, including Rebaudioside A, Rebaudioside B, Rebaudioside C, Rebaudioside D, and Rebaudioside E, and Dulcoside compounds. For convenience, the Rebaudiosides may be referred to here as Reb A, Reb B, Reb C, etc.

Of the rebaudiosides, Reb A is commonly used as sweetener in beverage applications, but has off-taste issues. Reb D has a better sugar character and more desirable taste than Reb A, but Reb D is difficult to use in beverage products because of its low solubility in water at room temperature. For instance, Reb D needs to be heated to near boiling water temperature for 2 hours in order to achieve complete dissolution. See US Publication 20110189360, for example. In room temperature, at most about 500 ppm can be solubilized in water.

Reb D has a sweetness potency similar to that of Reb A (about 200 times sweeter than sugar). As such, with about 500 ppm water solubility, Reb D can provide decent sweetness to the beverage. However, this solubility poses a problem for making a carbonated soft drink employing Reb D as a primary sweetener.

Traditional processes for making carbonated soft drinks (CSDs) require a 6 folds concentration of ingredients in a concentrate or syrup. This syrup is then diluted by 5 folds of water and injected with $CO_2$ to form the CSD (cola, lemon-lime, etc.). This works fine if all syrup ingredients are soluble in water to the extent of 6 folds of the level in the finished beverage. In other word, if Reb D is the primary sweetener of a CSD, its water solubility needs to be 3000 ppm if the finished beverage is formulated with 500 ppm of Reb D. US Publication 20110189360 teaches heating to near boiling, but this is not practical as the beverage bottler does not like to conduct such high temperature heating. Moreover, upon cooling Reb D may precipitate down from the super-saturated solution within a few hours.

Accordingly, it is an object of some aspects of the present invention to provide a method of making a diet CSD sweetened with low solubility sweeteners such as Reb D. Additional objects and advantages of all or certain embodiments of the systems and methods disclosed here will be apparent to those skilled in the art given the benefit of the following disclosure and discussion of certain exemplary embodiments.

SUMMARY

The present invention relates to a method of making a diet carbonated soft drink (CSD) sweetened with Reb D as the primary sweetener. The present invention utilizes unsweetened syrup and Reb D sweetened water.

DETAILED DESCRIPTION

Figure 2:
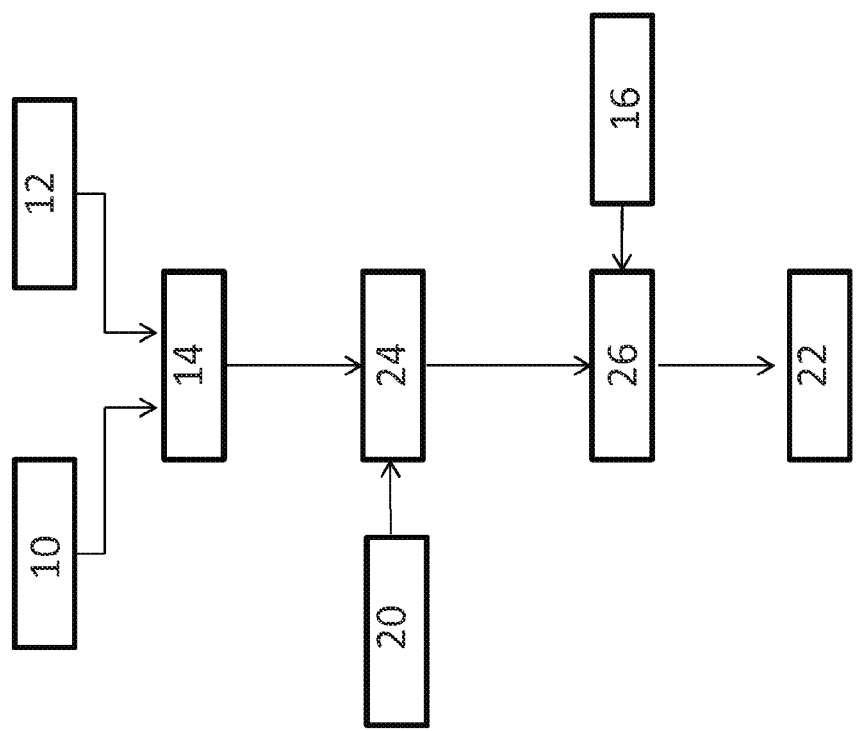
FIG. 2 is a flow chart depicting another aspect of the method of the invention.

Various examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments" and similar phrases each means that those embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component or ingredient being operative or configured to perform one or more specified functions, tasks and/or operations or the like, is intended to mean that it can perform such function(s), task(s) and/or operation(s) in at least certain embodiments, and may well be able to perform also one or more other functions, tasks and/or operations.

In accordance with aspects of the invention, Reb D is employed as the primary sweetener in diet CSDs. Diet CSDs are defined as beverages having 40 or fewer calories per serving (8 ounces). If the calories per serving is less than 5 calories, the CSDs can be defined as zero calories beverages.

Large quantities of carbonated beverages are typically not prepared in large quantity batches. Instead water is injected with carbon dioxide. The carbonated water and sweetened syrup are then injected simultaneously into containers such as bottles or cans to form the CSD. The container is quickly sealed. Alternatively, sweetened syrup and water are combined and then injected with carbon dioxide at the time of bottling of the beverage to form the CSD. The container is quickly sealed.

Traditionally one part syrup is combined with five parts water. The syrup is a concentrate and the ingredients must be soluble in this concentrate. For example, a typical sweetener in diet carbonated beverages is aspartame. The aspartame must be soluble in the syrup up to 3000 ppm in order to provide the desired sweetness value of 500 ppm when diluted with water. Other sweeteners including Reb A may be used in the syrup. These sweeteners have acceptable solubility in water.

Reb D and other poorly soluble natural sweeteners cannot be used as primary sweeteners in the CSD due to their poor solubility in the syrup. That is, one cannot obtain the desired concentration (6 folds of the dosage in the finished beverage) of Reb D in the syrup to obtain a diet beverage where Reb D is the desired sweetener. The present invention solves this problem by dissolving the Reb D in the water source instead of the syrup.

Figure 1:
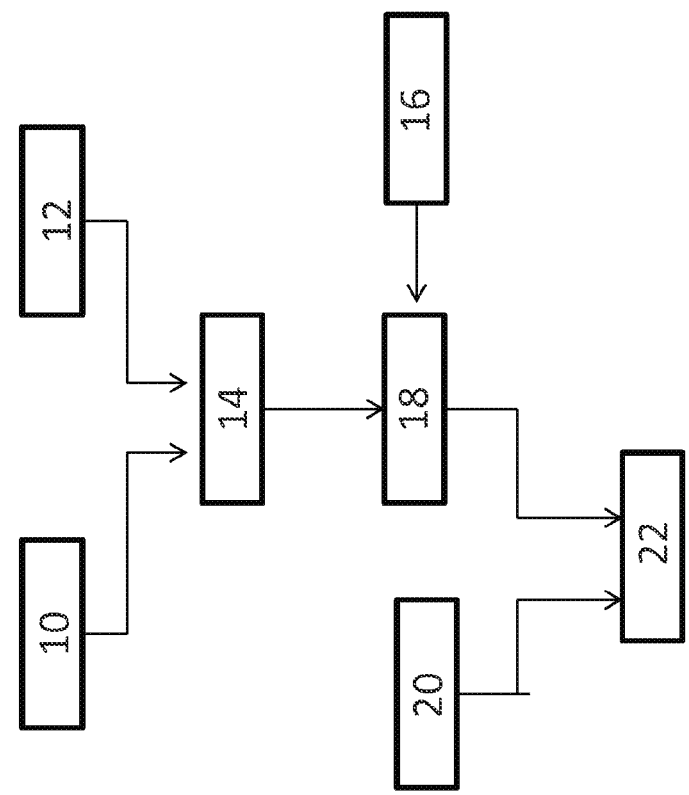
FIG. 1 is a flow chart depicting one aspect of the method of the invention.

Hence in one aspect as shown in FIG. 1, Reb D (10) is combined with water (12) to produce Reb D sweetened water (14). The Reb D sweetened water may be held in water storage tank. The Reb D sweetened water is injected with carbon dioxide (16) to produce carbonated Reb D sweetened water (18). Then the carbonated Reb D sweetened water (18) is injected into containers (22) simultaneously with unsweetened syrup (20) to form the diet CSD.

Alternatively, as shown in FIG. 2, Reb D (10) is combined with water (12) to produce Reb D sweetened water (14). The Reb D sweetened water (14) is mixed with unsweetened syrup (202) to form sweetened syrup water (24) which is then injected with carbon dioxide (16) to form diet CSD (26) which is then injected into containers (22).

The Reb D sweetened water (14) may be held in a water storage tank for a time, but the remaining steps of adding syrup and carbonation as well as placing in containers are a continuous process. The containers may be any suitable container such as glass or plastic bottles or metal cans.

This present invention does not require the 6 fold concentration of Reb D to work since the Reb D is not being added to the syrup. Instead, Reb D is dissolved in the water portion of the process. The room temperature solubility of about 500 ppm Reb D is then sufficient to provide the desired sweetness in the resulting Reb D sweetened diet CSD.

The Reb D may be obtained from the *stevia* plant in any suitable manner. For example, *stevia* components are extracted from the *stevia* plant. The extracted components are subjected to fractionation (column chromatography) to separate components such as Reb D, Reb A, stevioside, and the like. The Reb D is isolated and purified by recrystallization, for example.

Water is typically taken from a purified water holding tank. The present invention simply sweetens the water in the holding tank with a sweetening amount of Reb D. No heating, other unnecessary ingredients, or high investment is required.

Reb D is added to the water in an amount up to 500 ppm, for example 400 to 500 ppm, 425 to 475 ppm, or 450 ppm. The temperature of the water is typically maintained at room temperature.

Since Reb D can provide good sweetness at low quantities and lacks the bitter or metallic aftertastes of artificial sweeteners or natural non-nutritive sweeteners such as Reb A, it is preferred to use Reb D as a primary sweetener. Other poorly soluble sweeteners are also contemplated.

The syrup disclosed here may contain a variety of ingredients depending on the desired properties and tastes of the CSD. For example suitable ingredients include, but are not limited to, flavorants, caffeine, caramel and other coloring agents or dyes, acids, preservatives, antifoaming agents, gums, emulsifiers, tea solids, cloud components, and mineral and non-mineral nutritional supplements.

Suitable flavorants may be, for example, natural and synthetic fruit flavors, botanical flavors such as cola and tea, spice flavorings, such as cassia, clove, cinnamon, pepper, ginger, vanilla spice flavorings, cardamom, coriander, root beer, sassafras, ginseng, and others.

Suitable acids may be, for example, phosphoric acid, citric acid, malic acid, tartaric acid, lactic acid, fumaric acid, ascorbic acid, glconic acid, succinic acid, maleic acid, adipic acid, cinnamic acid, glutaric acid, and mixtures of any of them.

Examples of non-mineral nutritional supplement ingredients are known to those of ordinary skill in the art and include, for example, antioxidants and vitamins, including Vitamins A, D, E (tocopherol), C (ascorbic acid), B (thiamine), B2 (riboflavin), B6, B12, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system may be used if desired. If a preservative system is used, it may be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BUT, TBHQ, dehydroacetic acid, dimethyldicarbonate, ethoxyquin, heptylparaben, and combinations thereof. Preservatives may be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure The terms "beverage concentrate" and "syrup" may be used interchangeably throughout this disclosure. At least certain exemplary embodiments of the beverage syrups contemplated are prepared with an initial volume of water to which the additional ingredients are added. Full strength beverage compositions may be formed from the beverage syrups by adding further volumes of water to the syrup. Typically, for example, full strength beverages may be prepared from the syrups by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverage products disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Carbon dioxide is used to provide effervescence to the beverages disclosed here. Any of the techniques and carbonating equipment known in the art for carbonating beverages may be employed. Carbon dioxide may enhance the beverage taste and appearance and may aid in safeguarding the beverage purity by inhibiting and destroying objectionable bacteria. A volume of gas occupies the same space as does the liquid by which it is dissolved. The carbon dioxide content may be selected by those skilled in the art based on the desired level of effervescence and the impact of the carbon dioxide on the taste or mouthfeel of the beverage. The carbonation may be natural or synthetic.

As used in this disclosure, unless otherwise specified, the term "added" or "combined" and like terms means that the multiple ingredients or components referred to (e.g., one or more sweeteners, etc.) are combined in any manner and in any order, with or without stirring or the like, etc.

Notwithstanding the claims, the invention is also defined by way of the following clauses:
1. A method of producing a diet carbonated soft drink comprising
   a. combining water and a sweetening amount of Reb D to produce Reb D sweetened water;
   b. injecting carbon dioxide into the Reb D sweetened water to produce carbonated Reb D sweetened water;
   c. combining the carbonated Reb D sweetened water with unsweetened syrup to form the diet carbonated soft drink.
2. The method according to clause 1 wherein the carbonated Reb D sweetened water is combined with the syrup by injecting a stream of carbonated Reb D sweetened water into a container simultaneously with a stream of unsweetened syrup.
3. The method according to clause 1 or clause 2 wherein the Reb D sweetened water contains 400 to 500 ppm Reb D.
4. The method according to any one of clauses 1-3 wherein the Reb D sweetened water contains 425 to 475 ppm Reb D.
5. The method according to any one of clauses 1-4 wherein the unsweetened syrup comprises one or more selected from colors, acids, caffeine, flavorants, and preservatives.
6. The method according to any one of clauses 1-5 further comprising combining the Reb D and water in a water holding tank.
7. The method according to any one of clauses 1-6 wherein 1 part syrup is combined with 5 parts Reb D sweetened water.
8. A diet carbonated soft drink prepared in accordance with the method according to any one of clauses 1-7.
9. The diet carbonated soft drink of clause 8 wherein the pH is 3 to 5.
10. A method of producing a diet carbonated soft drink comprising
    a. combining water and a sweetening amount of Rebaudioside D (Reb D) to produce Reb D sweetened water;
    b. combining the carbonated Reb D sweetened water with syrup;
    c. injecting carbon dioxide into the combined Reb D sweetened water and syrup to produce the diet carbonated soft drink.
11. The method according to clause 10 further comprising injecting the diet carbonated soft drink into containers.
12. The method according to clause 10 or clause 11 wherein the Reb D sweetened water contains 400 to 500 ppm Reb D.
13. The method according to any one of clauses 10-12 wherein the Reb D sweetened water contains 425 to 475 ppm Reb D.
14. The method according to any one of clauses 10-13 wherein the unsweetened syrup comprises one or more selected from colors, acids, caffeine, flavorants, and preservatives.
15. The method according to any one of clauses 10-14 further comprising combining the Reb D and water in a water holding tank.
16. The method according to any one of clauses 10-15 wherein 1 part syrup is combined with 5 parts Reb D sweetened water.
17. A diet carbonated soft drink prepared in accordance with the method according to any one of clauses 10-16.
18. The diet carbonated soft drink of clause 17 wherein the pH is 3 to 5.

EXAMPLE 1

Water is combined with Reb D powder to produce sweetened water having about 450 ppm Reb D. The Reb D sweetened water is combined with 4 volumes of carbon dioxide to form carbonated Reb D sweetened water. An unsweetened syrup is prepared containing at least cola flavor, phosphoric acid, and caffeine. The carbonated Reb D sweetened water and unsweetened syrup are injected simultaneously into bottles at a ratio of 5 parts water to 1 part syrup. The bottles are capped.

While this disclosure mentions specific examples and embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim.

What is claimed is:

1. A method of producing a diet carbonated soft drink comprising
   combining water and a sweetening amount of Rebaudioside D (Reb D) in the absence of heat to produce Reb D sweetened water containing 400 to 500 ppm Reb D;
   injecting carbon dioxide into the Reb D sweetened water to produce carbonated Reb D sweetened water; and
   combining the carbonated Reb D sweetened water with unsweetened syrup to form the diet carbonated soft drink.

2. The method of claim 1 wherein the carbonated Reb D sweetened water is combined with the syrup by injecting a stream of carbonated Reb D sweetened water into a container simultaneously with a stream of unsweetened syrup.

3. The method of claim 1 wherein the Reb D sweetened water contains 425 to 475 ppm Reb D.

4. The method of claim 1 wherein the unsweetened syrup comprises one or more selected from colors, acids, caffeine, flavorants, and preservatives.

5. The method of claim 1 further comprising combining the Reb D and water in a water holding tank.

6. The method of claim 1 wherein 1 part syrup is combined with 5 parts Reb D sweetened water.

7. A method of producing a diet carbonated soft drink comprising
   combining water and a sweetening amount of Rebaudioside D (Reb D) in the absence of heat to produce Reb D sweetened water containing 400 to 500 ppm Reb D;
   combining the Reb D sweetened water with syrup; and
   injecting carbon dioxide into the combined Reb D sweetened water and syrup to produce the diet carbonated soft drink.

8. The method of claim 7 further comprising injecting the diet carbonated soft drink into containers.

9. The method of claim 7 wherein the Reb D sweetened water contains 425 to 475 ppm Reb D.

10. The method of claim 7 wherein the syrup comprises one or more selected from colors, acids, caffeine, flavorants, and preservatives.

11. The method of claim 7 further comprising combining the Reb D and water in a water holding tank.

12. The method of claim 7 wherein 1 part syrup is combined with 5 parts Reb D sweetened water.

* * * * *